FRITZ K. MUELLER
INVENTOR.

BY
Alvin E. Moore,
ATTORNEY

Dec. 22, 1970  F. K. MUELLER  3,548,507
GYROSCOPIC INDICATING SYSTEM
Filed Sept. 5, 1967  7 Sheets-Sheet 3

FRITZ K. MUELLER
INVENTOR.

BY
Alvin E. Moore,
ATTORNEY

Dec. 22, 1970  F. K. MUELLER  3,548,507
GYROSCOPIC INDICATING SYSTEM
Filed Sept. 5, 1967  7 Sheets-Sheet 6

FRITZ K. MUELLER
INVENTOR.

BY
Alvin E. Moore,
ATTORNEY

FRITZ K. MUELLER

INVENTOR.

United States Patent Office 3,548,507
Patented Dec. 22, 1970

3,548,507
GYROSCOPIC INDICATING SYSTEM
Fritz K. Mueller, Huntsville, Ala., assignor to Astro-Space Laboratories, Inc., Huntsville, Ala.
Filed Sept. 5, 1967, Ser. No. 665,343
Int. Cl. G01c 19/02, 19/38, 19/44
U.S. Cl. 33—204
16 Claims

ABSTRACT OF THE DISCLOSURE

Two pendulously oscillating devices are utilized. They comprise oppositely-rotating, spherical gyroscopic rotors, on nearly frictionless bearings (air or electrostatic bearings), constructed and arranged for their axes to pendulously oscillate in substantially undamped oscillations. Each rotor is freely mounted in a rotor housing, and between this housing and the support which is adapted to be fixed to a vehicle there is a pendulously mounted gimballed assembly, on antifriction bearings, that is forced to oscillate in unison with the spherical gyroscopes. This synchronism enables measurement of the angles of tilting thru which each of the oppositely oscillating gimballed assemblies is forced to move. From the measuring devices (preferably electrical pickoffs on roll and pitch axes of the system), signals are provided which may be used in various ways; for example in compass indication and vehicle-attitude indication.

This invention pertains to a gyroscopic system comprising a pair of pendulously oscillating gimballed housings (with motors) that are forced to oscillate in synchronism with the undamped pendulous oscillation of a pair of oppositely-rotating, air-bearing-supported spherical gyroscopes. When stationary the system may indicate compass direction, or be part of a theodolite, or supply signals to a computer. When used on a moving vehicle it indicates compass direction and, if desired, the attitude of the vehicle about its roll and pitch axes.

The need for a relatively simple gyroscopic compass that is not adversely affected by vehicular accelerations and changes of attitude and course has long existed; but to date attempts to solve this problem have resulted in heavy, complicated, relatively inefficient and very expensive equipment.

In view of these facts, one of the objects of this invention is to provide an efficient, relatively simple and inexpensive gyroscopic compass, with very short reaction time.

Another object is to provide a north-sensing device which indicates compass direction even when it is mounted on a vehicle, such as a ship, boat, aircraft or tank, that is subjected to angular motions.

Another purpose is to supply an efficient indicator of a vehicle's motions about its roll and pitch axes.

Another purpose is to provide a single indicating system which comprises, in combination, means to perform any two or more of the above-indicated functions.

The foregoing and other objects of the invention will become more fully apparent from the following detailed explanation of principles and description of exemplary structure embodying the invention and from the accompanying drawings, in which.

Figure 1:
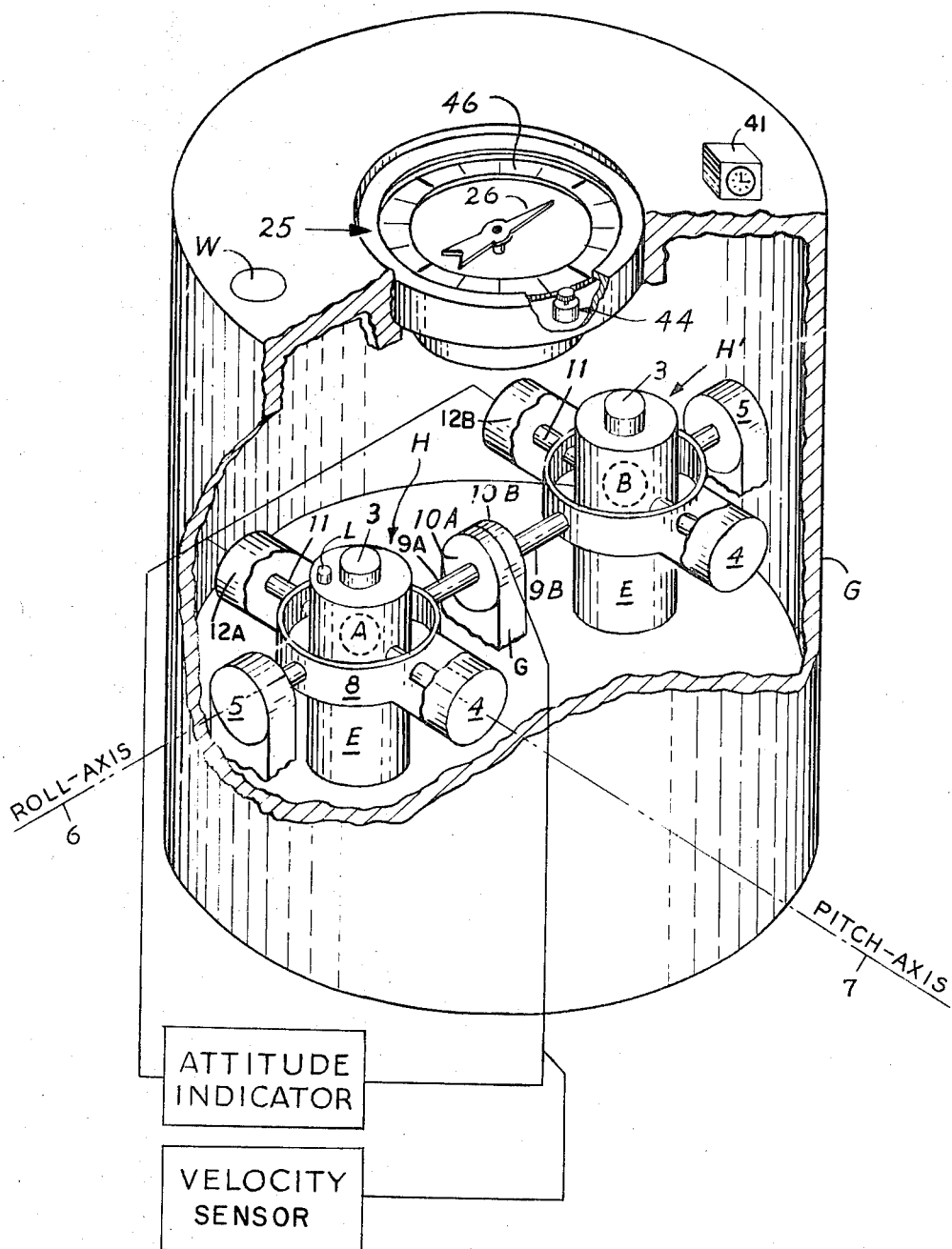
FIG. 1 is a perspective view, partly broken away, of a form of the invention.

In this gyroscopic system two oppositely-rotating, spherical, pendulous gyroscopic rotors, indicated in FIG. 1 at A and B are utilized. Each comprises a spherically surfaced driving element, in the form of a cup, rotated by motor E that is in the bottom part and fixed to a gimballed housing (H or H' of FIG. 1) and a spherical rotor or ball (1 of FIG. 2) that has a nearly frictionless bearing in the said driving element. This portion of the present invention is similar to Pat. No. 3,283,408, in which the present inventor was a co-inventor. Each gimballed housing is forced to remain in the same, leveled orientation relative to its contained spherical rotor by torquers 4 and 5 on its gimbal axes that react against the gimbal ring 8 and a portion of housing G, respectively, and are controlled by signals from an angle-sensitive device, 3, of changes in this orientation. Signals that are proportional to the extent of movements of each housing about its gimbal axes are supplied by electrical pickoffs 10A, 10B, and 12, or by equivalent mechanical differential means.

The main housing or supporting means of the gyroscopic system, G, may be on a moving vehicle. The axle means 9A (comprising two short axles on gimbal ring 8) and the axle means 9B (comprising two short axles on the gimbal ring of housing H')—all on the common axis 8—are journaled in conventional bearings that are supported by the wall of support housing G. In a similar manner the parallel axle means 11 are supported in bearings in the gimbal rings. These bearings are not specifically illustrated in FIG. 1, which is partly schematic; but in FIG. 2 ball bearings are shown as journaling one of the axle means 11 relative to the gimbal ring 8 of one of the rotor housings and gimbal assemblies. The other inner gimballed housing has similar conventional bearings and preferably is mounted so that the common axis 6 of the two sets of pendulously oscillating members is in the vertical plane of the roll axis of the vehicle, and the parallel axes 7 of the two sets are in vertical planes parallel to the vertical plane thru the vehicle's pitch axis.

Each of the oppositely-rotating spherical rotors is originally designed (by determination of its weight, angular momentum and the distance between its center of gravity and the upper pivot point of its center of pendulous oscillation) to swing in this oscillation with a period of approximately 84.4 minutes. After the motors and balls are installed in the housings H and H', and while the rotors are held stationary in a caging device of known type, the housings are leveled. This leveling, which may be manual or automatic, is done with the aid of biaxial level L (of FIG. 1) or the pair of levels L' (of FIG. 2), visible thru a window, such as W of FIG. 1. Although leveling means optionally may be on each housing, seen thru two windows, only one such means is shown in FIG. 1, on housing H; and the other housing, H', is so connected to H by the caging device or by electronic means that both housings may be leveled and synchronised with one leveling means and window.

After this installation and leveling, the two spherical rotors are carefully tuned to be exactly synchronized in exactly the same period of oscillation. This fine tuning is done by slightly reducing or increasing the weight of one of the balls. Preferably, a small ring of heavy material is fixed in the ball's upright bore (shown in FIG. 2) in such a way as not to interfere with light that goes to and from mirror 2; and in the tuning the weight of this ring may be reduced by means of a drill of the size that dentists use. Alternatively, the wall material of the cylindrical hole at the axis of the ball, may be reduced by drilling.

Figure 2:
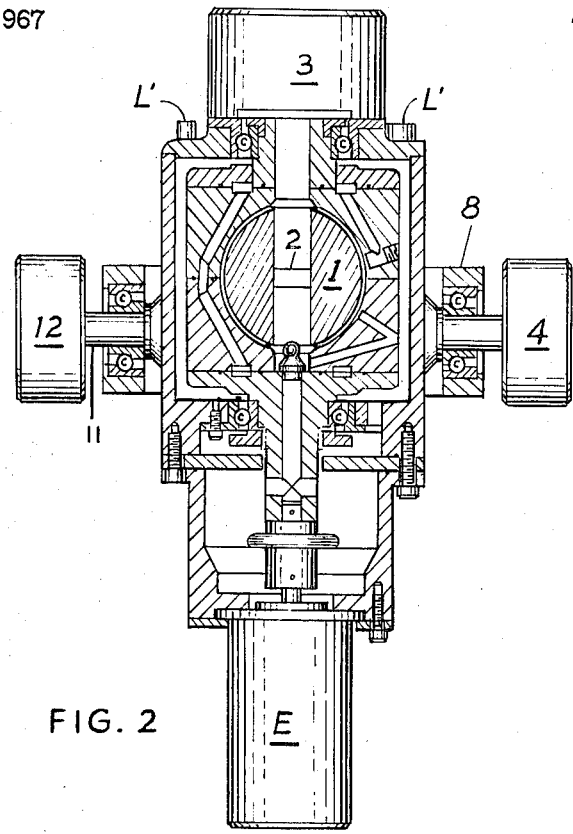
FIG. 2 is a sectional view of one of the oppositely rotating spherical-gyroscope assemblies of FIG. 1, taken from a vertical plane thru elements 3, 4 and 12 of FIG. 1.

In operation of the gyroscopic system, electric light from the position-sensing, biaxial electro-optical device 3 (of construction that is generally known in the art of gyroscopes) is reflected from the mirror 2, which as shown in FIG. 2, may be fixed in the middle of the central bore in each ball. And any angle other than the desired right angle between the light and the mirror causes a signal to be sent from the device thru an amplifier to actuate one or both of the electrical torquers 4 and 5. These torquers, of a known type, are schematically indicated in FIGS. 1 and 2. When the housing departs from its predetermined position relative to the rotor about the roll axis 6, a signal causes torquer 5 to bring the gimbal ring 8 and the gyroscope housing back into the proper position about this axis. Likewise, a deviation about the pitch-axis 7 leads to correction by torquer 4 of the position of the housing in ring 8, with respect to the pitch axis. Each of the gimballed housings is thus forced to pendulously oscillate with its air-film-supported spherical rotor.

As shown in FIGS. 1 and 2, each of the gimbal axles 9A and 9B on the common roll axis is connected to one of the angular pickoffs 10A and 10B (of any known type of device that transmits signals indicating angular position or movement). And, on the pitch axis, each of the gimbal axles 11 is connected to an angular pickoff (12A, 12B) that is of the same general type as 10A and 10B, and is immediately sensitive to changes in position of the housing relative to the ball about the pitch axis.

Figure 3:
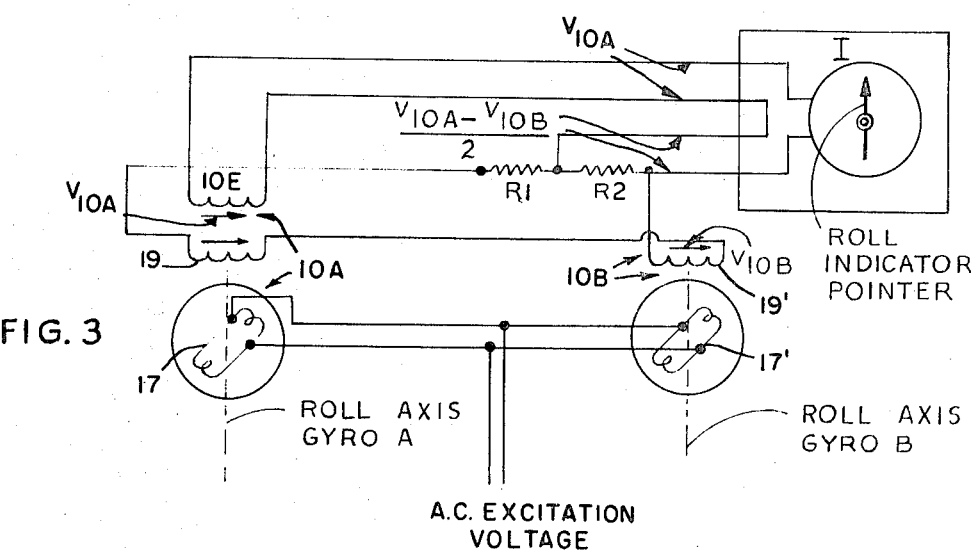
FIG. 3 is a diagram illustrating roll-axis pickoffs and an associated resistance network and vehicle roll indicator.

In the synchro pickoff 10A the synchro ("selsyn") windings are shown at 17, 19; and in the pickoff 10B the windings are shown at 17' and 19'. In known manner, the excitation winding 17 is supplied with alternating current of constant amplitude. As this winding changes in angular position (with axle 9A) it causes equal voltages $V_{10A}$ to be induced in the identical secondary coils 19 and 10E. Since small angular changes are involved, each of these voltages is substantially proportional to the angle thru which the axle 9A and the coil 17 turn. In a similar manner voltage $V_{10B}$ is proportional to the angle thru which the axle 9B and the primary coil 17' turn. Due to the fact that the coils 19 and 19' are connected in series and in opposition, as indicated in FIG. 3, the voltages $V_{10A}$ and $V_{10B}$ are summed. The summed voltage is applied to the equal resistors R1 and R2 in series. The current thru both resistors is equal to $$\frac{V_{10A} - V_{10B}}{R1 + R2}$$

but the output voltage, appearing across only R2 because it is conducted from between R1 and R2, is equal to $$\frac{V_{10A} - V_{10B}}{R1 + R2} \cdot R_2$$

Since R1 equals R2, this output voltage is half of $$V_{10A} - V_{10B}$$

and as indicated in FIG. 3, it is conducted to the vehicle-roll indicator I. This indicator, a phase-sensitive voltmeter of known type, comprises calibrations that indicate the direction and amount of roll. Also the voltage $V_{10A}$ from coil 10E is conducted into the indicator. As shown in FIG. 3, the two voltages are connected in series in the indicator.

During the operation of the instrument these tendencies toward changes in position of each of the housings H and H' about its two gimbal axes continually occur because of the pendulous oscillation of the gas-supported, freely-mounted spherical rotor, and (when the instrument is on a moving vehicle) by the changes in position of the vehicle. But the immediate, nearly simultaneous corrections by torquers 4 and 5 continually move each housing so that it remains aligned with the spinning axis of the spherical rotor, and thus oscillates in tune with the pendulous oscillation of the ball.

These pendulous oscillations of the oppositely-rotating gyroscopes are important features of the present invention. While the equation for the period of an ordinary, one-axis pendulum is $$T(\text{time}) = 2\pi \sqrt{\frac{\text{inertia}}{\text{weight}}} \times \text{length}$$

that for the oscillatory time of a pendulous gyroscope is $$T = 2\pi \times \frac{\text{angular momentum}}{\text{weight} \times \text{length}}$$

To make a long period for the pendulous gyroscopes of this invention the pendulum length of each spherical rotor is made very small—only a few thousandths of an inch; and, as pointed out above, parameters are selected and tuning is done to provide an oscillation time of both rotors that is exactly the same and is approximately 84 minutes. Because they are nearly frictionless and undamped these rotors 1 continually produce one circular or cone motion in this time interval; and because of the electro-optical position-indicating device 3 and the torquers 4 and 5 each housing (H or H') similarly and continually oscillates in a circular or cone motion. This cone motion, which is begun by the earth's rotation and is maintained by the earth's rotation and the frictionless mounting of the balls is defined by the motion of each ball's center of gravity and spinning axis relative to the means line of the pendulous oscillation of its axis.

The gimbal axles of each of the oppositely-rotating gyroscopic systems are separately journalled, preferably in antifriction bearings as indicated in FIG. 2. The friction of these bearings, which is small but much larger than the nearly frictionless air bearings of the balls 1 tends to damp the oscillation of the gimballed housings; and the weight of the motor and its wiring also affect this oscillation. In the absence of the present inventive combination of elements these period-distributing influences would cause each gimballed housing to continually and irregularly oscillate out of tune with the ball. But by means of the device 3 (sensitive to the position of the housing relative to the ball's spin axis) and the torquers or motive devices 4 and 5 the oscillatory period of each pendulous housing is forced to be in synchronism with the period of the ball. Meanwhile, the pickoffs on the roll and pitch axes of the housings are continually sending signals to indicating means, which, as in FIG. 14, may include a computer. These signals, which are accurate indications of the positions of the housings H and H' at each instant, may be used for various purposes, for example in compass indication and vehicle attitude indication.

The earth's rotation causes relative easterly angular motions of both gyroscopic pendulums which are cancelled out by the electrical pickoffs and network, yet gravity acting on the pendulums causes north and south deviation on the gimbals, which are added and used in the north indicator or compass. The mean gravity vector of the spherical gyroscopes (the resultant of the gravity vectors of the oppositely rotating balls) always remains in the east-west plane; it does not move either to the north or the south of that plane. Within the east-west plane the mean gravity vector goes out of the vertical—makes oscillations in that plane.

COMPENSATION FOR VEHICULAR ANGULAR MOTIONS

If the vehicle has angular motions with respect to its desired attitude the gyroscopic system holds to predetermined angular positions. The support housing of the instrument, G, is fixed to the vehicle, preferably in such a way that the roll axis 6 coincides with the longitudinal axis of the vehicle. But alternatively the roll axis 6 may be parallel to but above or below the longitudinal axis.

When the vehicle rolls about roll axis 6 in either direction the two angular pickoffs 10A and 10B indicate angles in the same direction. Similarly, vehicular motion about pitch axis 7 causes the two angular pickoffs 12 to indicate angles in the same direction. The corresponding pickoffs 10A, 10B and 12, 12 are connected in such a way (as will be explained in more detail below) that the values of these angles that are in the same direction cancel each other. Therefore, no angular motion of the vehicle about the roll or pitch axis can influence the functioning of the north-sensing feature of this invention, which will be detailed below.

COMPENSATION FOR VEHICULAR HORIZONTAL ACCELERATIONS

Vehicular horizontal accelerations acting on an ordinary pendulum that has a period of approximately 84 minutes produce torques on the pendulum in the direction of the vehicular motion. These torques pivot the pendulum about an axis that is horizontal and normal to the direction of vehicular motion in such a way that the upright median line of the pendulum points always to the center of the earth, regardless of the horizontal velocity that is achieved. When, on the other hand, the pendulum is in the form of a pendulous gyroscope, and two oppositely rotating spherical gyroscopes of the type of this invention are used, the plane thru the two upright median lines of the conical oscillating paths of the 84-minute gyros always goes thru the center of the earth. Within that plane, however, the projected lines of the axes of the two gyroscopes tilt with respect to each other, varying in directions of tilting, depending on the directions of the accelerations. This tilting is due to the gyroscopic effects of the spheres. Thus at each instant of acceleration the lower parts (and the centers of gravity) of the spheres go either toward or away from each other, but the mean or resultant vector of the projected lines of the axes always goes thru the center of the earth. Since this vector is the median line of the gyroscopic system its functioning is not adversely influenced by vehicular horizontal accelerations.

The approximately 84.4-minute tuning of the pendulous spherical gyro, achieved by having the distance between the gyro rotor's center of gravity and its center of pendulous oscillation very small, is a critical feature of the compensation in this invention for vehicular horizontal accelerations. An acceleration acting on the 84.4-minute pendulum produces torques on the pendulum in the direction of vehicular motion, so that the resulting angular velocity of the pendulum and the corresponding angle of the pendulum relative to its original position are identical with the angular velocity and corresponding angular change in the gravity direction due to vehicular motion. If the tuning of the periods of these spherical gyros were any other than the approximate 84 minutes of this invention the said plane thru the upright median lines would never remain the same, or go thru the center of the earth except perhaps momentarily as a matter of accident.

NORTH-SENSING FEATURE

Figure 4:
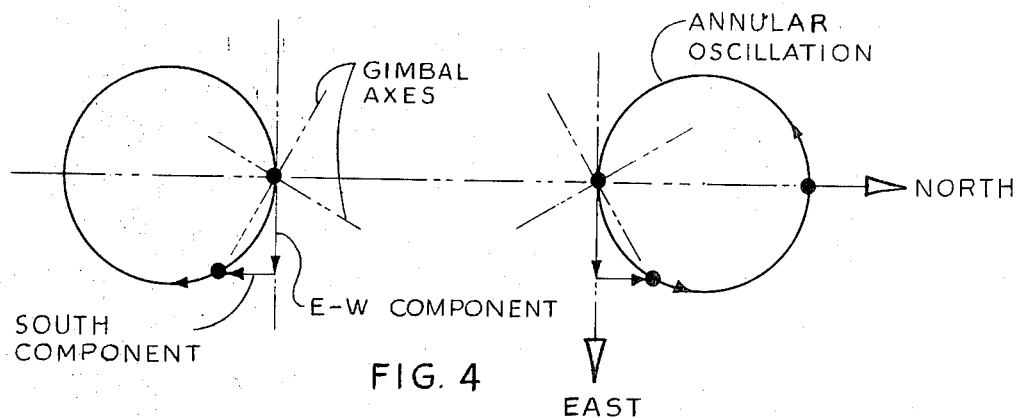
FIGS. 4 to 6 are diagrams schematically showing the effects of the earth's rotation on the gyroscopic system.
Figures 5A, 5B:
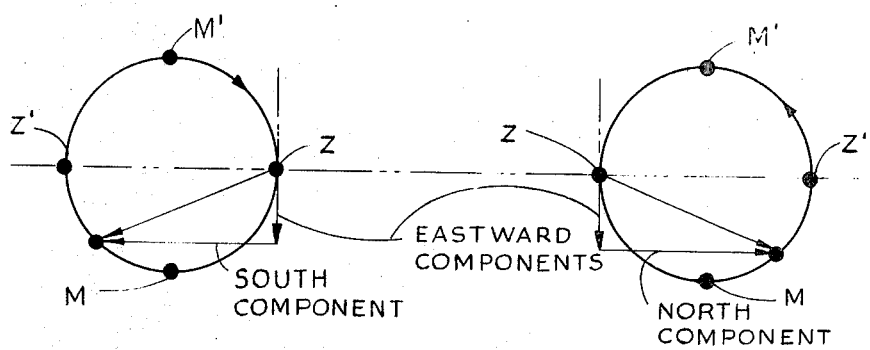
Figure 6:
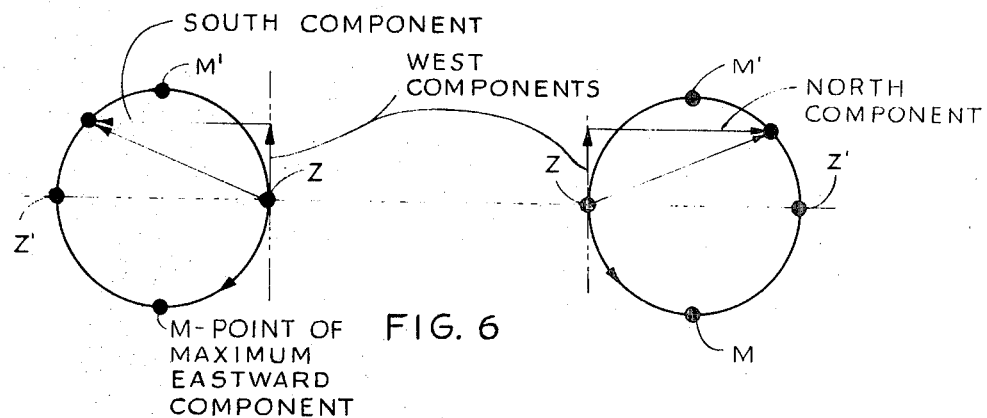

With reference to the diagrams of FIGS. 4 to 6: In the beginning of the first oscillation from the given starting point the pendulous gyroscopes have zero eastward components and zero northward and southward components. Then oscillatory motion begins, in an easterly direction regardless of the orientation of housing G; and it is eastward and equal for both of the spherical rotors. Each rotor thus begins to build up a steadily increasing eastward component, but at the same time one of the two gyros is building up a northward component and the other a southward component. In this buildup the eastward components develop according to a sine function and the north and south components develop according to a cosine function. In both gyroscopes, indicated in FIGS. 5A, 5B and 6, the values of the eastward components increase in the same direction, to the points M (maximum) shown in FIGS. 5A and 5B; and thence they are gradually reduced to zero (at points Z'). Thereafter, westward components begin to develop, and they build up, in the same, westward direction, to maximum values at points M'. Then these westward components are gradually reduced until they become zero at points Z. Thereafter there are repeated cycles of such pendulous oscillations.

During each oscillation the north and south components are also continually changing. But, as indicated in the diagrams of FIGS. 5A and 5B, these components are opposite in the two gyroscopes. For example, in the oscillation of the left-hand gyro, as indicated in FIG. 5A: starting at point Z, there is no north-south component; then a southward component gradually builds up to half of its maximum value at point M, and to its maximum value at point Z'. Thereafter, it declines and again reaches half of its maximum value at point M', and then again reaches zero at point Z. In the oscillation of the right-hand gyroscope a similar sequence occurs, but in this case the component that begins to build up shortly after point Z is a northward component (FIG. 5B); and thus the north-south components of the two gyros are opposite.

During the oscillations of the two pendulums, comprising the gimballed housings and gyroscopic, spherical rotors, the values of these components are measured by the pickoff system (10A, 10B and 12, 12) on the gimbal axes. Angles going in the same direction are cancelled out and those in different directions are added together. Therefore, the east-west components are cancelled out and the north-south components are added and indicated. Since the roll and pitch axes 6 and 7 of the vehicular or housing coordinate system are not in cardinal-point directions each gimbal axis will comprise the movements of east-west and north-south angles.

Figure 7:
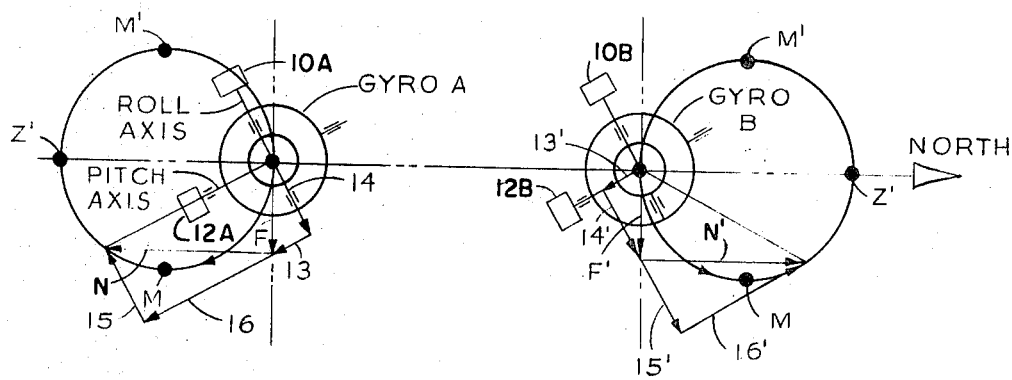
FIGS. 7 and 8 are diagrams illustrating the measurement and indication of components and their resultants by the gimbal-axis pickoffs and an associated resolver.
Figure 8:
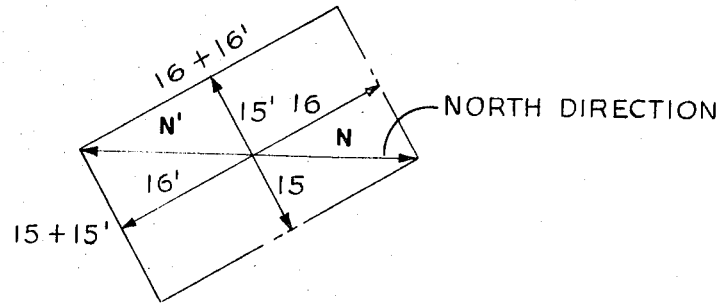

The manner in which the pickoff system and associated resolver operate to measure and indicate the components and their resultants is shown in the diagrams of FIGS. 7 and 8. Here the roll-axis pickoffs of gyros A and B are respectively indicated at 10A and 10B, and the pitch-axis pickoffs at 12A and 12B. The east components are indicated at F and F' and the north-south components at N and N'. The gimbal system and the corresponding pickoffs 10A, 12A, 10B, and 12B resolve the east components (respectively F and F') into components 13, 13' and 14, 14', which coincide respectively with the pitch and roll axes of the gimbals. Likewise the north-south components N and N' are resolved by the gimbal system into components 15, 16 and 15', 16'. The roll-axis pickoffs 10A and 10B are connected in series, with opposite polarities, so that the signals which are produced in the same direction (e.g., 13 and 13') cancel each other. Likewise the pitch-axis pickoffs 12A and 12B are connected with opposite polarities, so that the unidirectional components 14 and 14' also cancel each other.

The subcomponents 15 and 15' of the north-south components N and N' which coincide with the roll axis are added together by the series connections of the pickoffs R and R' because the components 15 and 15' point in opposite directions, and the sub-components 16 and 16' of the north-south components N and N' are also added together by the series and opposite-polarity connections pick-offs 12A and 12B, because these sub-components are also in opposite directions. Therefore only the north-south components are indicated by the gimbal system pickoffs 10A–10B and 12A–12B.

Similarly, west sub-components of the movements of the pitch-axis gimbals are cancelled, and the north-south sub-components relative to the pitch axis are added. In the resolver, as explained below, the north-south signals (the only signals) from the roll axis and the pitch axis are geometrically added in an indicator. Any known type of pickoffs—for example, potentiometers, synchro devices, digital pickoffs, mechanical levers, differential gears, or optical pickups—may be used.

Figure 9A:
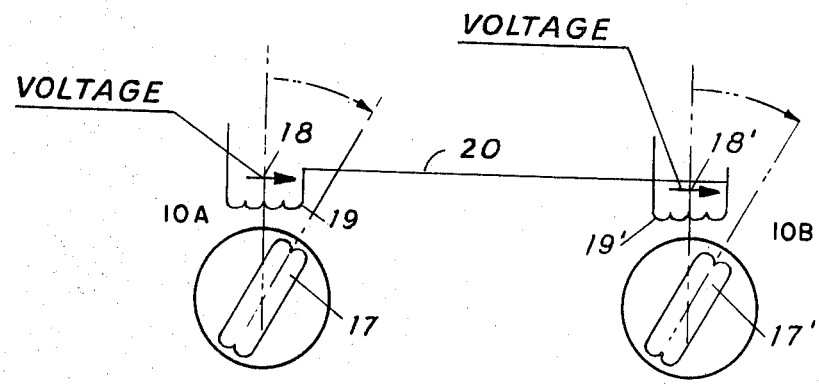
FIGS. 9A, 9B and 10 are diagrams illustrating the operation of a resolver which cancels east-west sub-components of the system and adds the north-south sub-components.
Figure 9B:
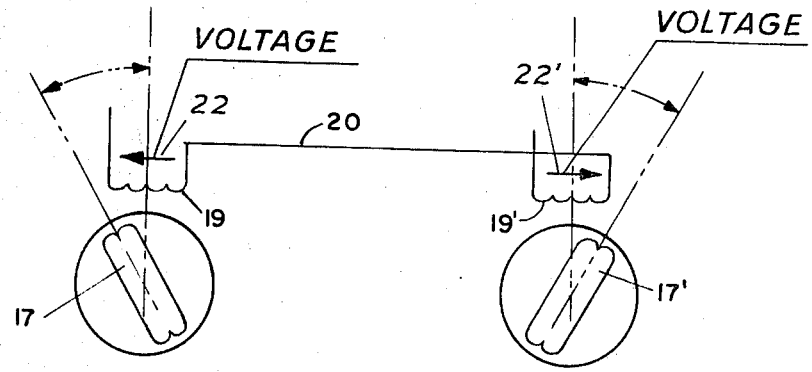
Figure 10:
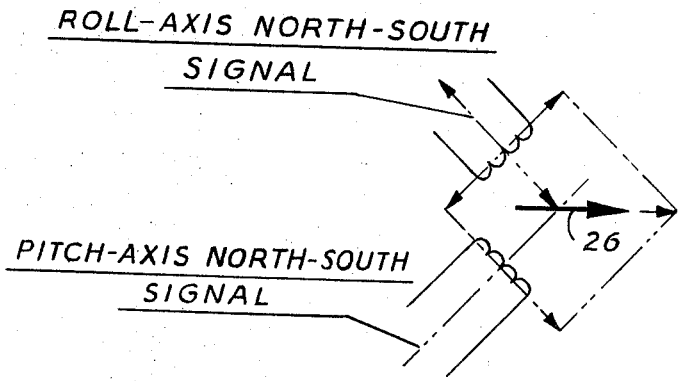

One example of the basic resolver which acts as an electrical differential means in cancelling the east-west sub-components and which adds the north-south sub-components from each of the gimbal axes is shown in the "selsyn" (synchro) devices and their electrical connections of FIGS. 9A, 9B, and 10. In FIG. 9A the two synchro roll-axis pickoffs of the two gyros are indicated at 10A and 10B. Primary coils 17 and 17' are moved by the roll axles of the gimbal system in the same direction, inducing equal, unidirectional voltages 18 and 18'. The voltage 18 goes from secondary coil 19 thru wire 20, which is connected to the secondary coils 19 and 19' in such a way that voltage 18 opposes and cancels voltage 18'.

In FIG. 9B primary coils 17 and 17' are moved by the roll axles of the gimbal system in opposite directions, because of north-south sub-components of the oscillations, inducing equal, opposite voltages 22 and 22'. The voltage from secondary coil 19 thru wire 20 is connected to secondary winding 19 in series and with opposite polarities, to augment and add the two opposite voltages 22 and 22'.

The above analysis of the operation of the roll-axis pickoff system is also applicable to the gimbal axles on the pitch axis. The pickoffs on this axis cancel the unidirectional east-west sub-components and add the counter-directional, north-south sub-components. Thus only north-south signals from the two sets of synchro devices are sent into the north-direction indicator 25 (FIG. 1). This indicator geometrically adds the two signals, and its pointer 26 originally points and continues to point to the north.

Figure 11:
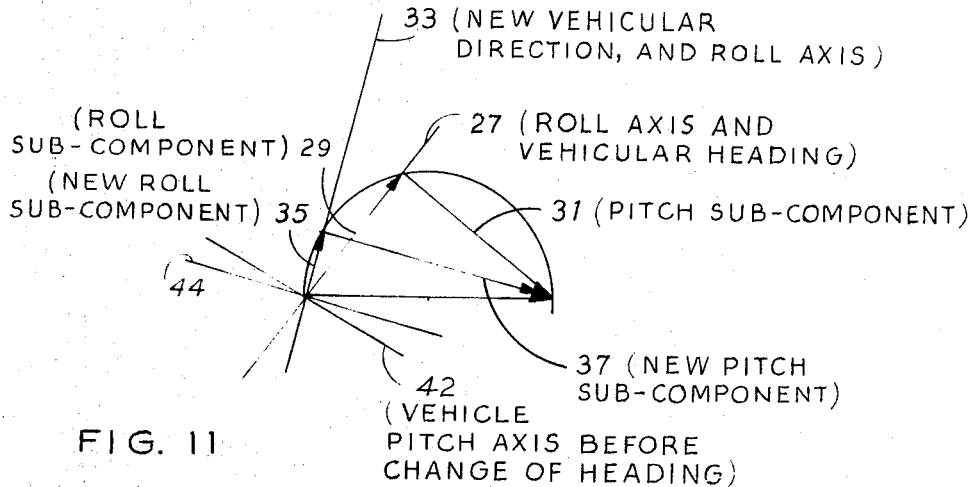
FIGS. 11 to 13 are diagrams illustrating the manner in which the north-seeking pointer is influenced by the sub-components but remains in northern indication regardless of change of the vehicle's heading.
Figure 12:
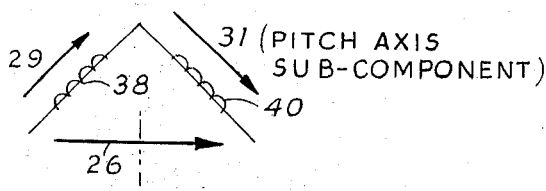
Figure 13:
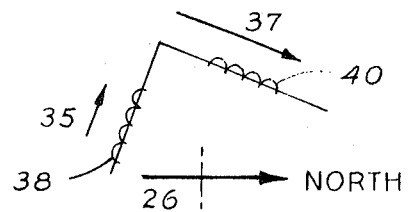

The pointer remains in this northward indication regardless of vehicular azimuthal motions because of facts that are indicated in the diagrams of FIGS. 11, 12, and 13. As pointed out above, the value of the north-south component, in northward indication in all vehicular headings, varies according to the changing time in the sequence of the annular pendulous oscillation. But the relative values of the roll-axis and pitch-axis sub-components vary as the vehicle changes its azimuthal heading. In FIG. 11, one set of these values (for a given vehicular orientation 27) is shown at 29 (the roll-axis sub-component) and 31 (the pitch-axis sub-component). When the vehicle's longitudinal axis rotates in azimuth to position 33 the roll-axis sub-component has changed to 35 and the pitch-axis sub-component to 37. The repeater coil 38, indicated in FIGS. 12 and 13, is always in line with the vehicular longitudinal or roll axis. In FIG. 12, coil 38 is in line with this vehicle axis and is in position 27 of FIG. 11; and in FIG. 13 it is aligned with position 33. Coil 40 in FIGS. 12 and 13 is, respectively, in line with positions 42 and 44 of the vehicle's pitch axis. As the vehicle's longitudinal axis rotates in azimuth from 27 to 33, the pitch-axis sub-component signal changes in value, as indicated in FIGS. 11 to 13, from 31 to 37, and the roll-signal value changes from 29 to 35. But for the reasons pointed out above, and as indicated in FIGS. 12 and 13, the indicator or compass 25, including pointer 26, remains in the same position, always indicating the north direction. When the coils 38 and 40 turn with the vehicle from their position in FIG. 12 to that of FIG. 13, the value 29 in coil 38 becomes the smaller value 35 of FIG. 13, but the value 31 of coil 40 becomes correspondingly larger, to value 37. Thus the combined magnetic influence on pointer 26 remains the same in any change of the vehicle's heading.

As pointed out above, in each annular oscillation of each gyroscope there is a zero position of the north-south components, at point Z (FIGS. 5A and 5B). In many practical uses of the instrument this slight period when no north-seeking function exists is of no disadvantage. But more continuous north indication, if desired, may be obtained by eliminating these zero positions in the following manner. With reference to FIGS. 1, 2 and 5A to 7, the pendulous motions of the two spherical gyroscopes reach points M approximately 21 minutes from the beginning of the two oscillations at Z and reach points Z' at about 42 minutes from the beginning. At some regular time in the oscillation—preferably not earlier than 21 minutes and not later than 42 minutes from its beginning—an oscillation-damping bias signal is imposed on the biaxial electro-optical pickoff 3 and its electrical network including the torquers. This may be done by a timing device—for example, an electric clock, which may be mounted on the main instrument housing as indicated at 41 in FIG. 1. The clock switches an electric circuit to supply a separate voltage to the electro-optical device 3 and thus unbalances the servo system. Thus the wires between 3 and the torquers 4 and 5 the clock-changed signals go to the appropriate torquers, and cause them to pivot the housings toward the centers of their previous, large-radius annular oscillations. When such pivoting entirely to the center is not done, a small residual annular oscillation remains, which provides a north-south component at every position in the reduced circle of oscillation. Thus in this form of the instrument continuous compass indication is achieved. In another advantage of this type of instrument, the undesired east-west components are greatly reduced. Alternatively, a mechanical pivoting of the gyroscopes into the center by a caging device is possible after sufficient north indication. The gyros have to be stopped and restarted after setting.

The radius of the circle described by the center of gravity of each spherical rotor becomes smaller as the system moves on a vehicle into a higher latitude. This change does not affect north indication by the system because the east-west components are cancelled out by the pickoff system and resolver.

ATTITUDE INDICATION

Optionally, the pitch and roll motions may be indicated in an attitude indicator. An example of such a roll indicating means comprises structure in which motion around the roll axis is indicated in the following manner: (1) sending a signal from pickoff 10A of gyro A to an indicator: (2) halving the sum of the signals from pickoffs 10A and 10B, of both gyros, and sending the resulting second, halved signal to the indicator. The indicator (I of FIG. 3) comprises a pointer, and means for turning the pointer comprising, for example, electromagnetic coils of the type indicated in FIG. 10; and electrical connecting means, of the type shown in FIG. 3, which includes conductors for sending signal voltage $V_{10A}$ from one of the roll-axis secondary coils to the coils of the indicator, and a resistance network for halving the sum of the voltage $V_{10A}$ and voltage $V_{10B}$ from the other roll-axis secondary coil, and sending the halved signal to the indicator coils. Alternatively, the means for halving and transmitting the roll-axis signals may comprise synchro devices or a mechanical differential.

In the resistance network of FIG. 3, a voltage proportional to the vehicle roll angle is produced in the following way: The roll axis pickoff 10A produces a voltage $V_{10A}$, which is proportional to the roll angle and the gyroscope's pendulous angle. This voltage is carried into roll indicator I. Another voltage $$\frac{V_{10A} - V_{10B}}{2}$$

is produced by subtracting the output voltage ($V_{10B}$) of gyro pickoff 10B from $V_{10A}$, and dividing it by 2 in the resistive network which comprises equal resistances R, R. This second voltage is proportional to the gyro pendulous angle and is also fed into roll indicator, I. Within the indicator the voltage $$\frac{V_{10A} - V_{10B}}{2}$$

is subtracted from the voltage $V_{10A}$. The resultant voltage, which is proportional to the roll angle, is used to actuate the pointer that indicates the roll angle.

Obviously, the part of the attitude indicating system which indicates the pitch angle is similar to the roll indication means.

COMPENSATION FOR VEHICULAR HORIZONTAL VELOCITY

Figure 14:
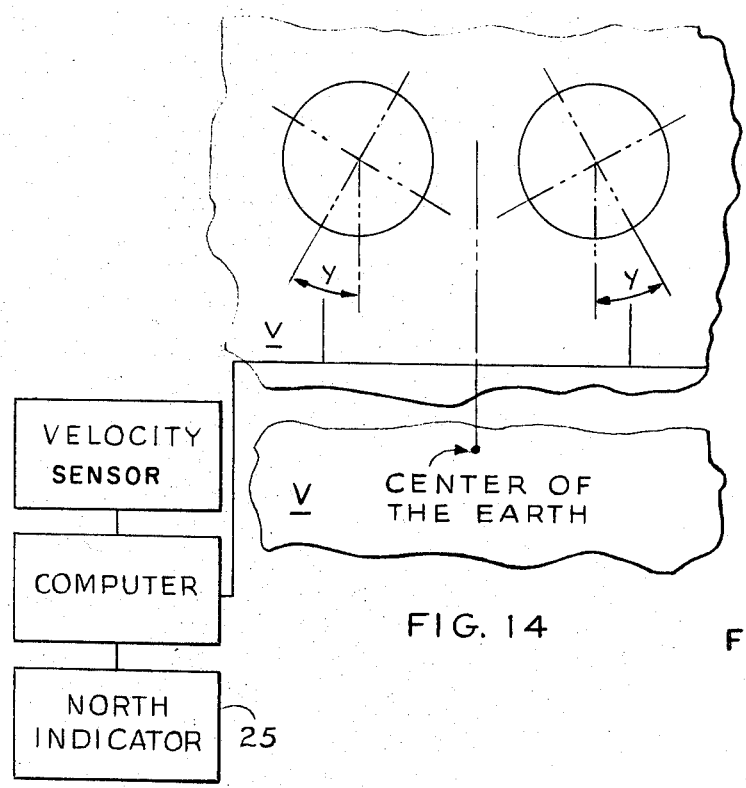
FIG. 14 is a schematic showing of the invented system as including a velocity sensor, computer and compass.

Vehicular horizontal velocity of travel relative to the earth axes of the gyroscopes to swing relative to each other from the inclined positions imparted by earth rotation, in the plane V of FIG. 14. As explained above, under "Compensation for Vehicular Horizontal Accelerations," the value of this increment of the swing angle between these lines is a measure of the vehicle's travel velocity. If, for example, this velocity is only in an easterly direction, the plane V is in the north-south direction, and the swing angles y are also in the north-south direction. By the pickoff system (10A, 10B and 12, 12, FIG. 1), these angles are added automatically to the north-south components of the north-sensing output of the gyroscope. If this velocity is only in a westerly direction, the plane and swing angles are still in the north-south direction, but the pickoff system now is automatically subtracting the angles from the north-south components of the north-sensing output. When the velocity is in the easterly direction the lower parts of the pendulous gyroscopes move away from each other; and when the velocity is toward the west these lower parts move toward each other. This means that the north or south components of the north-sensing feature will be somewhat larger or smaller than when the craft is at rest, depending on the easterly or westerly direction of the velocity. It appears as if the earth's rotation were somewhat faster or slower. No north error will result from a purely easterly or westerly direction of velocity.

When the velocity is in a northerly direction, the plane V is in an east-west direction and the swing angles of y are also in that direction. The lower parts of the gyros then swing outward. On the other hand, when the velocity is toward the south the swing angles are still in that plane, but the lower parts of the gyroscopes swing toward each other. Since these swing angles, caused by velocity of the vehicle, are always in directions opposite to each other they are added together in the pickoff system. This addition is made by the type of electrical circuitry indicated in FIG. 9B. This comprises secondary synchro coils that are electrically connected in series with opposite polarities. Therefore, since the directions of these swing angles are opposite the indication involves their addition. The earth's rotation does not produce counterdirectional swing angles in the east-west V plane. This is because of the following fact: When the earth turns beneath the gyroscopes, toward the east, it causes apparent swing angles relative to the gyroscopes' axes which are in the same direction. Since these apparent swing angles thus are in the same direction and equal the opposite-polarity circuitry cancels them out. Thus the earth's rotation, in any latitude, never causes any counter-directional, accuracy-disturbing swing angles in the east-west plane. If there are any east-west counter-directional swing angles they are always due to northerly or southerly velocity components. These components of the swing angles in the east-west V plane are therefore proportional to the northerly or southerly velocity components only. Since the indicator 25, schematically shown in FIG. 14, comprises an electrical resolver of known type, as well as the indicator pointer 26 and scale 46, it adds geometrically all counter-directional swing angles. Thus it adds the east-west swing angles caused by the north or south velocity components to the north-south swing angles caused by earth rotation. This addition leads to a small error and therefore unless corrected the north-south indication would be inaccurate. On many vehicles that do not travel at rocket or jet-propelled speeds this slight inaccuracy can be ignored as not preventing practical efficiency of the compass; but if desired, improved accuracy may be achieved by the pilot's or operator's rough, empirical calculation based on the vehicle's velocity and direction.

But optionally accurate correction for the speed-caused error may be made by measuring the north or south component of the velocity of the vehicle. This velocity of the vehicle can be measured by a velocity sensor or velocity meter (indicated in FIG. 1), for example, a Pitot pressure tube, or by integrating accelerometers, of known design. The velocity output of these instruments is an electrical voltage which is proportional to the velocity of the vehicle. This voltage is supplied thru conventional electrical wiring into a potentiometer of a known type—for instance the sine potentiometer of FIG. 15, whose wiper is driven by the corrected output of the north-sensing instrument. The north-sensing instrument provides the angle between the longitudinal axis of the vehicle and the north direction. The wiper of the sine potentiometer therefore picks up a voltage proportional to the component of vehicular velocity which falls in north or south direction. These northerly or southerly velocity components are normal to the earth's rotational velocity which is always in easterly direction. Therefore, they alter the north indication and are used for correction.

Figure 15:
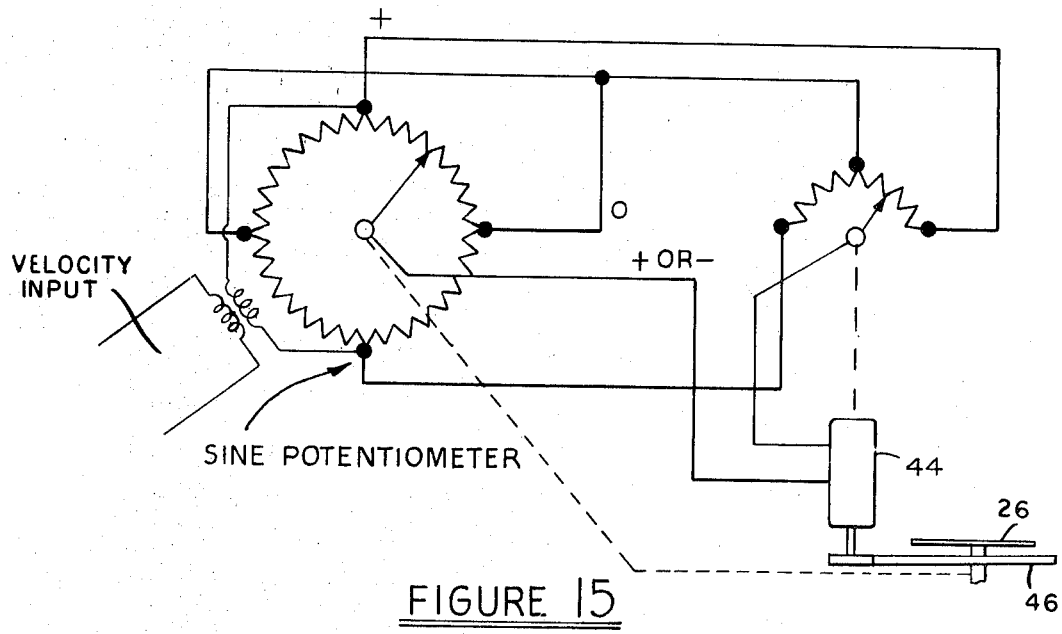
FIGS. 15 and 16 are diagrams illustrating means of velocity error compensation.

The correcting signal may be introduced in various ways—for example, by having the signal control the step motor 44 (FIGS. 1 and 15). The voltage from the sine potentiometer is compared to the voltage of a potentiometer driven by the step motor 44. The difference in voltage is used to drive the step motor. The step motor rotates the readout scale of the indicator 25 or any indicators by an amount corresponding to the error voltage, thus countering the unwanted signal.

As indicated in FIG. 14, another means of correcting for this undesired feature involves a computer which receives the north-south velocity components from means described before and subtracts these components in known computer fashion. The converted value is sent to the north indicating device.

When the vehicle is not moving in a cardinal direction—for example toward the northeast—the plane V, as before, is normal to the direction of motion and swing angles y, caused by the velocity, occur in this plane. Thus they produce components in both the east-west and the north-south direction. Each of these two sets of components have the above indicated effects. But in the vehicular coordinate system these velocity-caused swing angles occur only in the pitch-axis pickoff system 12.

Figure 16:
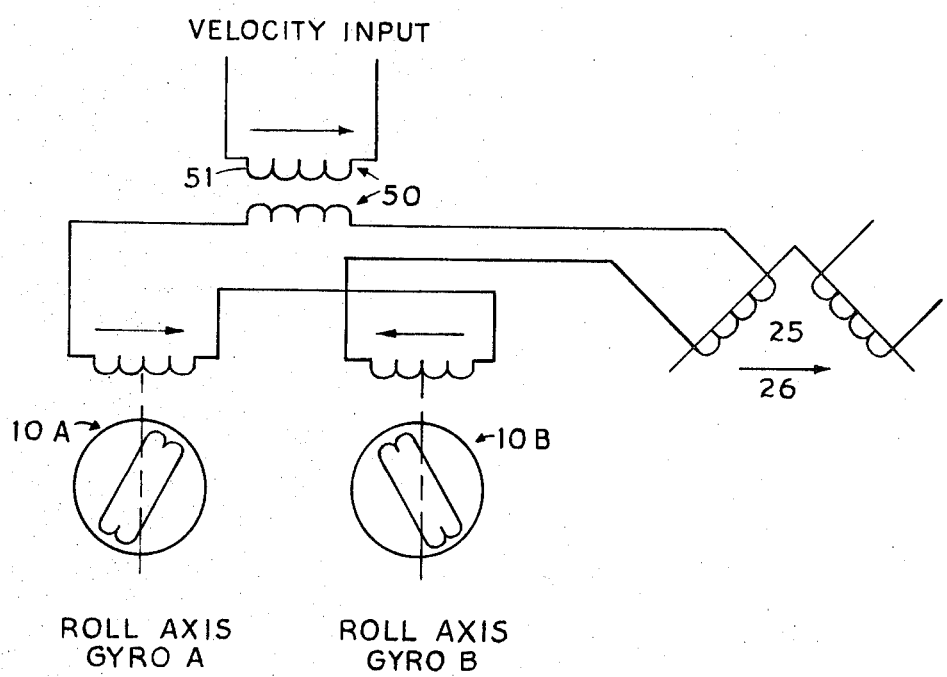

Therefore another possibility of velocity-error compensation is illustrated in FIG. 16. To the basic circuitry that is shown and described in connection with FIG. 9B, a transformer 50 is added, in series with the coils of the roll pickoffs 10A and 10B. This transformer receives at the primary coil 51 the voltage supplied by the velocity pickoff of the velocity meter as described before. The secondary coil subtracts the velocity value which is signalled by the pickoff system 10A and 10B; and no velocity error will be transmitted to the indicator 25.

In one specific example of the correction of the north-sensing feature due to the speed-caused error: For a velocity of 30 miles an hour in purely northerly or southerly direction, the components added or subtracted to the north-south components of the north-sensing feature result in a misdirection of ± two degrees. This small error is easily corrected by the above-described corrective means.

VERTICAL COMPONENT OF THE EARTH'S ROTATION

The vertical component of the earth's rotation, changes with changes in the latitude of the location. And since the gyroscopes do not rotate with this changing component this component can lead to a small error. Compensation for this inaccuracy may be made in the transmitter repeater at the indicator by a step motor or servo motor. When step motor 44 is thus latitude-influenced, for example, the spacing of its steps is altered by means of a latitude knob of known type. This knob, for instance, may control a potentiometer which is used to regulate the speed of the electric timing motor which controls the steps of the motor. The latitude setting of the knob may be changed either manually or automatically with change in latitude. When this change is automatic, and for example on an When step motor 44 is thus latitude-influenced, for example, the spacing of its steps is altered by means of a latitude knob of known type. This knob, for instance, may control a potentiometer which is used to regulate the speed of the electric timing motor which controls the steps of the instrument is desired in intervals of a tenth of a degree of latitude change, one step is required in about every four minutes.

I claim:

1. A gyroscopic system, comprising supporting means and a pair of connected pendulously oscillating devices within and supported for oscillation relative to said means, each of said devices comprising:
   a gimbal ring and bearings between said ring and supporting means, allowing the ring to pivot on a common pivotal axis of the pair of gimbal rings;
   a rotor housing within said gimbal ring and bearings between said housing and ring, allowing the housing to pivot on a second axis that is normal to said common axis, and together with said first-named bearings allowing the housing to oscillate with its axis defining a cone;
   a spherical gyroscopic rotor, in each rotor housing, freely mounted for universal-bearing movement and pendulous, conical oscillation of its axis in said housing constructed and arranged to provide a period of said oscillation that is substantially 84 minutes, with the center line of the rotor oscillation freely tilted in the east-west plane by the earth's rotation;
   a nearly frictionless bearing supporting said rotor, without appreciable friction, for substantially undamped spinning;
   motive means in said rotor housing for spinning the said rotor in a direction opposite to that of the other rotor of said pair, having a center of gravity lower than that of the rotor;
   a position-sensitive device, for each housing, sensing departures of the rotor housing from a predetermined position in which its axis is in alignment with the said axis of the spherical rotor, supplying a deviation signal of each departure and of the direction of movement of the housing in the departure;
   torquing means connected to said gimbal ring and housing, receiving and influenced by the deviation signals, to maintain the housing in said predetermined position; and
   signaling pickoff means, connected to said housing and gimbal ring to said gimbal ring and supporting means, respectively for sending signals measuring the movements of said housing by said torquing means to a location outside of said supporting means.

2. A system as set forth in claim 1, in which the spin axes of said gyroscopic rotors prior to the beginning of their opposite rotation in pendulous oscillation are vertical, and in said conical oscillation the said center lines of the oscillation are in a vertical plane, said system further comprising leveling means to facilitate vertical positioning of said axes prior to said beginning.

3. A system as set forth in claim 2, in which said signaling means comprises differential means for placing in opposition and cancelling the equal east-west sub-components of effects of said pendulous oscillations and adding the north-south sub-components of said effects into two north-south signals; and
   an indicator influenced by said two north-south signals to indicate compass direction.

4. A device as set forth in claim 3, in which said signals are electric voltages, and said signalling means comprises electromagnetic coils, and said indicator comprises electromagnetic means and a pointer.

5. A device as set forth in claim 3, in which said nearly frictionless bearings are gaseous bearings.

6. A system as set forth in claim 2, in which said signaling means comprises: a primary electric coil connected to and turning with each of said gimbal rings and housings; and a secondary electric coil, adjacent each primary coil, in which a signal voltage is induced by angular movement of said primary coil;
   and in which said system further comprises: electrical connecting means, connecting, with opposite polarities, the secondary coils that turn with said common-axis pair of gimbal rings, and electrical connecting means connecting, with opposite polarities, the secondary coils that turn with said housings, whereby electric signals of the east-west sub-components of said pendulous oscillations oppose and cancel each other, and electric signals of the north-south sub-components of said oscillations are added together in two north-indicating signals; and
   an indicator comprising: coils electrically connected with said connecting means, receiving said north-indicating signals; and means indicating compass direction.

7. A system as set forth in claim 6, adapted to be placed on a vehicle, with the said common axis being in a plane thru the roll axis of the vehicle and said pair of second gimbal axes being in planes that are parallel to the vehicle's pitch axis, and in which said system further comprises means, connected to and influenced by signals from said coils, for indicating the extent of roll of the vehicle.

8. A system as set forth in claim 2, in which said system is adapted to be placed on a vehicle, with the said common axis being in the vertical plane thru the roll axis of the vehicle and said pair of second axes being in vertical planes that are parallel to the vehicle's pitch axis, and in which a said pickoff means at said common axis comprises a primary electromagnetic coil that moves with a pitch-axis gimbal ring and a secondary electric coil in which a signal voltage is generated by movement of said primary coil; and in which said system further comprises: a vehicle-pitch-indicating system having a pointer and electromagnetic coils for actuating the pointer; electrical connecting means for conducting the signal voltage from one of said secondary coils to said electromagnetic coils of the pitch-indicating system; and an electrical resistance network for halving the sum of the signal voltages from said secondary coils and transmitting the half-sum signal voltage to said coils of the indicating system.

9. A system as set forth in claim 8, which further comprises means, connected to and controlled by signal voltages from said secondary coils adjacent to the said roll and pitch axes, for indicating the north-south direction.

10. A system as set forth in claim 1, in which said measuring signals are electrical and said means for sending the measuring signals comprises an electrical pickoff at each gimbal ring and housing, sensitive to and measuring the angle of movement of the housing about each of its oscillation axes, comprising: electric means connecting in series, with opposite polarities, a pickoff of one gimbal ring at said common axis with a pickoff of the other gimbal ring at said common axis; and electrical means connecting in series, with opposite polarities, a pickoff of one housing at its said second axis with a pickoff of the other housing at its said second axis, whereby the said measuring signal that are caused by rolling or pitching motion of the supporting means are balanced against each other and cancelled.

11. A system as set forth in claim 10, in which a said pickoff means at each of said second axes comprises a primary electromagnetic coil that moves with the adjacent, roll-axis gimbal ring and a secondary electric coil in which a signal voltage is generated by movement of said primary coil; and in which said system further comprises: a vehicle-roll-indicating system having a pointer and electromagnetic coils for actuating the pointer; electrical connecting means for conducting the signal voltage from one of said secondary coils to said electromagnetic coils of the roll-indicating system; and an electrical resistance network for halving the sum of the signal voltages from said secondary coils and transmitting the half-sum signal voltage to said coils of the roll-indicating system.

12. A system as set forth in claim 1, in which all of said signals are electric voltages.

13. A system as set forth in claim 1, in which said nearly frictionless bearings are gaseous bearings.

14. A system as set forth in claim 1, adapted to be placed on a vehicle, with the said common axis being in a plane thru the roll axis of the vehicle and said pair of second axes being in planes that are parallel to the vehicle's pitch axis, and in which said system further comprises means, connected to receive signals from the said pickoff means, for indicating the north-south direction.

15. A system as set forth in claim 1, which further comprises means, connected to receive said measuring signals, to indicate the direction of north.

16. A gyroscopic system, comprising:
a support, adapted to be fixed to a vehicle that is subject to accelerations and changes of course;
axle means, journaled relative to said support;
a gimbal ring connected to and pivoted with said axle means;
a second axle means, orthogonally arranged with respect to said first-named axle means, journaled relative to said gimbal ring;
a rotor housing, within and pivoted on said gimbal ring, connected to said second axle;
a spherical gyroscopic rotor in said rotor housing, freely mounted for universal-bearing movement and pendulous oscillation of its axis in said housing, constructed and arranged to provide a period of said oscillation in the neighborhood of 84 minutes;
an air bearing supporting said rotor in substantially frictionless condition for subtsantially undamped spinning;
motive means for spinning said rotor in one direction, having a center of gravity lower than that of the rotor;
electrical means for sensing the position of the said axis relative to said housing and providing electric signals of this position;
a pair of torquers, one being drivably connected to each of said axle means actuated by said signals, for forcing said housing to oscillate in substantial unison with said rotor and in said period;
a third axle means, journaled relative to said support, coaxial with said first-named axle;
a gimbal ring connected to and pivotal with said third axle means;
a fourth axle means, orthogonally arranged with respect to said third axle means, parallel to said second axle means, journaled relative to said gimbal ring;
a second housing, within and pivoted on said gimbal ring, fixed to said fourth axle means;
a second spherical gyroscopic rotor, freely mounted for universal-bearing movement and pendulous oscillation of its axis in said second housing, constructed and arranged to provide a period of said last-named oscillation equal to that of the oscillation of said first-named rotor;
means for spinning said second rotor in a direction opposite to that of said first-named rotor;
a pair of pickoff means, one on each of said coaxial axle means, for transmitting electrical signals of angular movement of each of said axle means around their common axis;
a pair of pickoff means, one on each of said second and fourth axle means, for transmitting electrical signals of angular movement of each of the last-named axle means about its axis;
the said signals from the several pickoffs having north-south and east-west components;
means for electrically connecting said first-named pair of pickoff means in series with opposite polarities; and
means electrically connecting said second-named pair of pickoff means in series with opposite polarities.

References Cited

UNITED STATES PATENTS

| 1,932,412 | 10/1933 | Keen | 33—226 |
| 1,969,965 | 8/1934 | Chessin | 33—226X |
| 1,998,948 | 4/1935 | Wittkuhns et al. | 33—226 |
| 2,093,503 | 9/1937 | Wittkuhns et al. | 33—204(.2) |
| 3,238,792 | 3/1966 | Unterberger | 33—226X |
| 3,283,408 | 11/1966 | Rothe et al. | 33—226X |

FOREIGN PATENTS

| 1,344,301 | 10/1963 | France | 33—226 |

OTHER REFERENCES

Wrigley, Walter. "Schuler Tuning Characteristics in Navigational Instruments." Navigation, December 1950, vol. 2, pp. 282–290 VKIN3, copy in Group 280, 33–226.

ROBERT B. HULL, Primary Examiner

U.S. Cl. X.R.

33—226; 74—5.34